(12) United States Patent
Juels et al.

(10) Patent No.: US 8,874,904 B1
(45) Date of Patent: Oct. 28, 2014

(54) VIEW COMPUTATION AND TRANSMISSION FOR A SET OF KEYS REFRESHED OVER MULTIPLE EPOCHS IN A CRYPTOGRAPHIC DEVICE

(71) Applicant: EMC Corporation, Hopkinton, MA (US)

(72) Inventors: Ari Juels, Brookline, MA (US); Kevin D. Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/713,658

(22) Filed: Dec. 13, 2012

(51) Int. Cl.
*H04L 9/00* (2006.01)
*H04L 9/32* (2006.01)

(52) U.S. Cl.
CPC ................................ *H04L 9/3213* (2013.01)
USPC ........... 713/156; 713/172; 713/176; 713/181; 713/189; 726/2; 726/4; 726/5; 726/9

(58) Field of Classification Search
CPC ..... H04L 9/14; H04L 9/3226; H04L 2209/24; H04L 2209/38; H04L 45/7453; H04L 9/0869; G06F 21/31; G06F 21/602; G06F 21/44; G06F 21/62; H04W 12/06
USPC ........... 713/172, 176, 181, 189; 726/2, 4–5, 9
See application file for complete search history.

(56) References Cited

U.S. PATENT DOCUMENTS

| | | | | |
|---|---|---|---|---|
| 6,978,022 | B2 * | 12/2005 | Okimoto et al. | 380/211 |
| 7,383,244 | B2 * | 6/2008 | Bass et al. | 1/1 |
| 7,697,691 | B2 * | 4/2010 | Sutton et al. | 380/277 |
| 2005/0120203 | A1 * | 6/2005 | Yeh et al. | 713/156 |
| 2007/0118746 | A1 * | 5/2007 | Lauter et al. | 713/170 |
| 2008/0009345 | A1 * | 1/2008 | Bailey et al. | 463/29 |
| 2008/0059601 | A1 * | 3/2008 | Yoshikawa | 709/212 |
| 2011/0010547 | A1 * | 1/2011 | Noda | 713/168 |
| 2012/0321125 | A1 * | 12/2012 | Choi et al. | 382/100 |

* cited by examiner

*Primary Examiner* — Michael Chao
*Assistant Examiner* — Shiuh-Huei Ku
(74) *Attorney, Agent, or Firm* — Ryan, Mason & Lewis, LLP

(57) ABSTRACT

A first cryptographic device is configured to store a set of keys that is refreshed in each of a plurality of epochs. The first cryptographic device computes for each of at least a subset of the epochs at least one view based on at least a portion of the set of keys for that epoch, and transmits the views to a second cryptographic device in association with their respective epochs. At least one view computed for a current one of the epochs is configured for utilization in combination with one or more previous views computed for one or more previous ones of the epochs to permit the second cryptographic device to confirm authenticity of the set of keys for the current epoch. The first cryptographic device may include an authentication token and the second cryptographic device may include an authentication server.

21 Claims, 4 Drawing Sheets

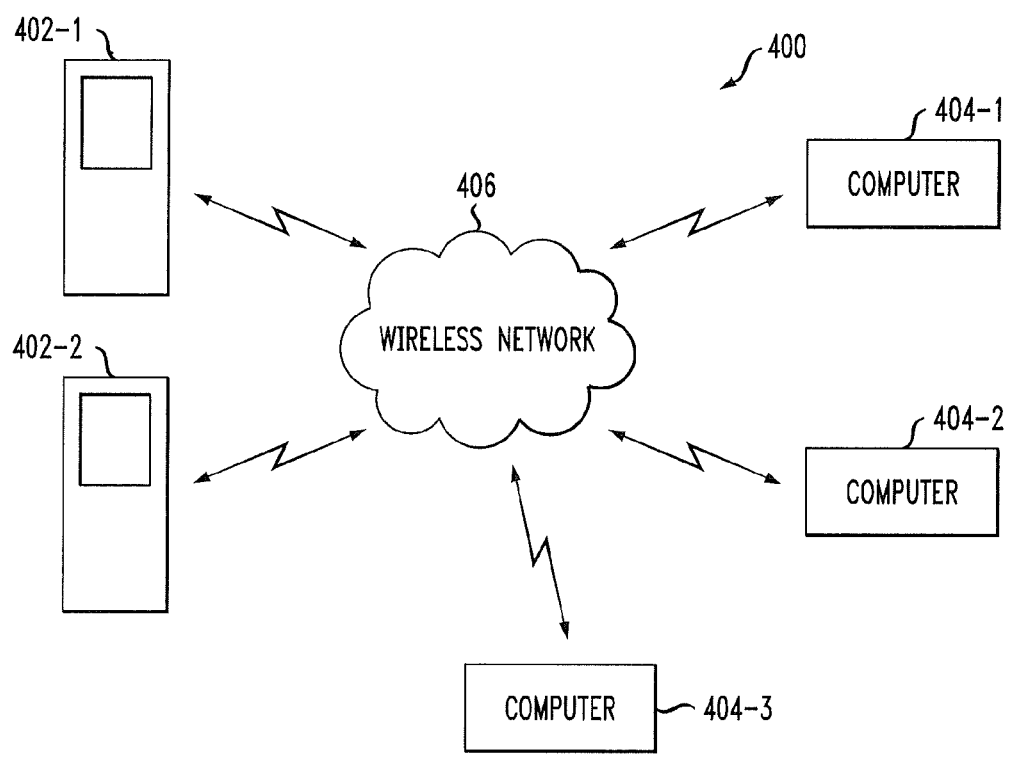

US 8,874,904 B1

VIEW COMPUTATION AND TRANSMISSION FOR A SET OF KEYS REFRESHED OVER MULTIPLE EPOCHS IN A CRYPTOGRAPHIC DEVICE

FIELD

The field relates generally to cryptography, and more particularly to authentication techniques implemented using cryptographic devices.

BACKGROUND

Cryptographic devices include, by way of example, one-time passcode (OTP) devices such as authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In authentication tokens of this type, the passcodes are wirelessly communicated to a computer or other element of an authentication system. These wired or wireless arrangements, also referred to herein as connected tokens, save the user the trouble of reading the passcode from the display and manually entering it into the computer.

The above arrangements may be viewed as examples of what are more generally referred to herein as hardware authentication tokens. However, authentication tokens can also be implemented in the form of software installed on a computer, mobile phone or other processing device. Like hardware authentication tokens, software authentication tokens can be implemented as time-synchronous, event-synchronous, or hybrid time-synchronous and event-synchronous tokens.

Hardware and software authentication tokens and other types of OTP devices are typically programmed with a random seed or other type of key that is also stored in a token record file. The record file is loaded into an authentication server, such that the server can create matching passcodes for the authentication token based on the key and the current time or current event count.

In order to protect authentication tokens against cloning attacks, the keys used by these tokens may be periodically refreshed using an approach known as drifting keys, in which a set of secret keys shared between an authentication token and an authentication server evolves randomly over time. Periodic refresh operations are applied to the set of keys, typically at the start of respective time periods. Such time periods are examples of what more generally referred to herein as "epochs."

SUMMARY

One or more illustrative embodiments of the present invention provide enhanced protection against cloning attacks on hardware and software authentication tokens as well as other types of cryptographic devices.

In one embodiment, a first cryptographic device is configured to store a set of keys that is refreshed in each of a plurality of epochs. The first cryptographic device computes for each of at least a subset of the epochs at least one view comprising a portion of the set of keys for that epoch, and transmits the views to a second cryptographic device in association with their respective epochs. At least one view computed for a current one of the epochs is configured for utilization in combination with one or more previous views computed for one or more previous ones of the epochs to permit the second cryptographic device to confirm authenticity of the set of keys for the current epoch.

Computing the views may involve, for example, determining a plurality of pseudorandom vectors, and generating the views as respective view vectors based on respective ones of the pseudorandom vectors, where sub-vectors defined by a designated group of elements of each view vector are substantially linearly independent, or satisfy other specified conditions designed to ensure that the views contain significant amounts of new information regarding the set of keys.

In computing and transmitting the views, the first cryptographic device may select from a plurality of possible views at a given time, transmit the selected view, and repeat the selecting and transmitting at each of one or more additional times. These times may correspond, for example, to respective authentication times. The views may be encoded into passcodes that are sent by the first cryptographic device to the second cryptographic device in conjunction with respective authentications.

The first cryptographic device may illustratively comprise an authentication token and the second cryptographic device may illustratively comprise an authentication server.

BRIEF DESCRIPTION OF THE DRAWINGS

FIG. 4 shows an embodiment of another communication system that incorporates view processing functionality of the type illustrated in FIG. 3.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as to encompass not only authentication tokens but also other types of devices that can generate or otherwise process views for keys that are refreshed over multiple epochs. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides view computation and transmission techniques and other view processing functionality for facilitating secure authentication of passcodes provided by authentication tokens and other types of cryptographic devices.

Figure 1:
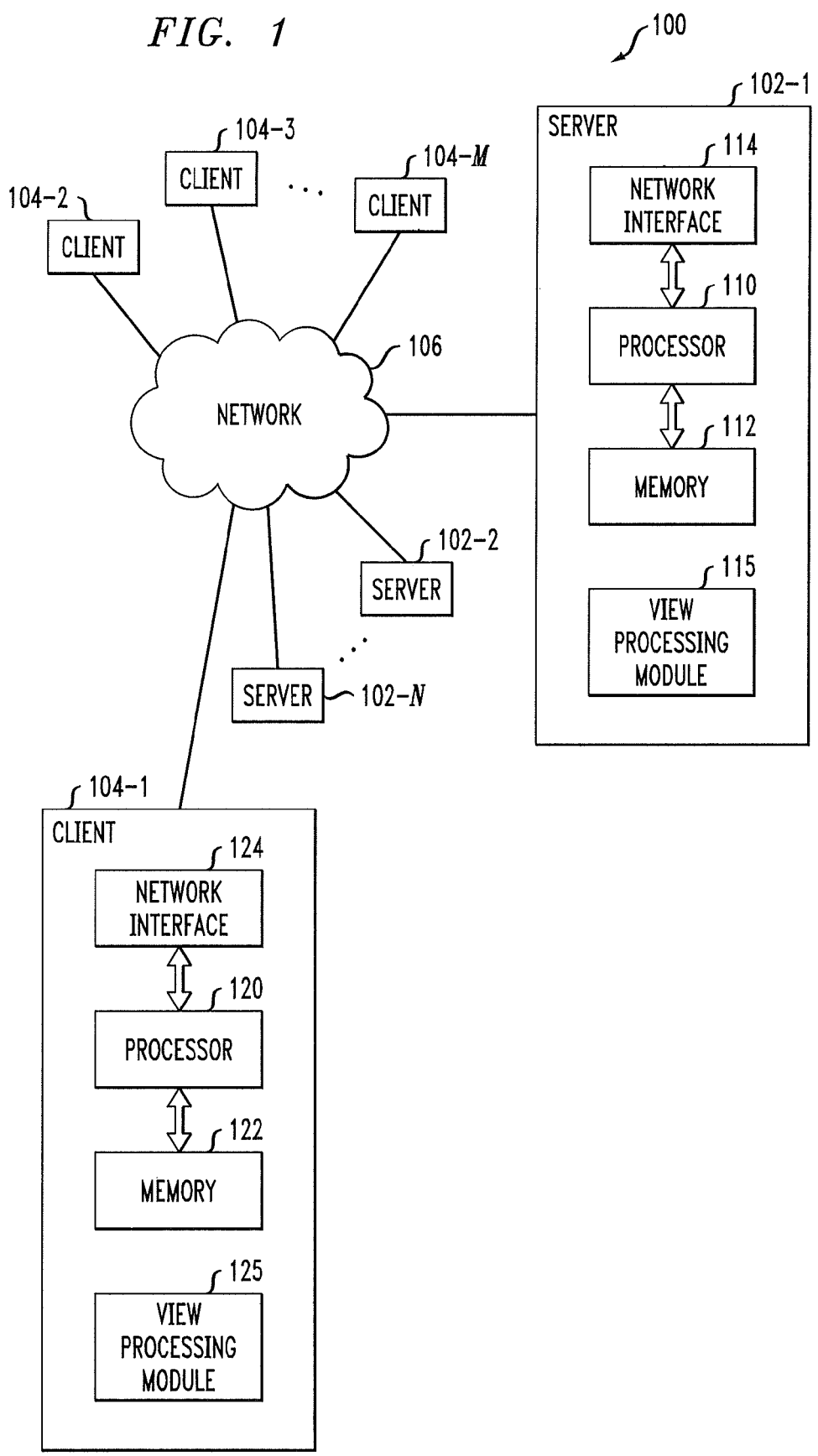
FIG. 1 is a block diagram of a communication system with view processing functionality for sets of keys in an illustrative embodiment of the invention.

FIG. 1 shows a communication system 100 that incorporates view processing functionality in an illustrative embodiment. The system 100 comprises a plurality of servers 102-1, 102-2, ... 102-N that are configured to communicate with a plurality of clients 104-1, 104-2, ... 104-M, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for view computation and transmission. An example of such a process performed at least in part in conjunction with a given one of the clients 104 authenticating to one or more of the servers 102 will be described in conjunction with FIG. 3, but it is to be appreciated that numerous other types of processes may be used in other embodiments.

A given one of the servers 102-1 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102-1 is network interface circuitry 114. The network interface circuitry 114 allows the server 102-1 to communicate over the network 106 with the other servers 102 and with the clients 104, and may comprise one or more conventional transceivers.

The server 102-1 further includes a view processing module 115. This module may be implemented at least in part in the form of software that is stored in memory 112 and executed by processor 110. The view processing module 115 of the server 102-1 processes views that are computed and transmitted by the client 104-1 in order to facilitate secure authentication of that client by the server.

The other servers 102 of the system 100 are assumed to be configured in a manner similar to that shown for server 102-1 in the figure.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the servers 102 and with the other clients 104, and may comprise one or more conventional transceivers.

The client 104-1 further includes a view processing module 125. This module may be implemented at least in part in the form of software that is stored in memory 122 and executed by processor 120. The view processing module 125 of the client 104-1 computes and transmits views that are processed by the server 102-1 in order to facilitate secure authentication of that client by the server.

The other clients 104 of the system 100 are assumed to be configured in a manner similar to that shown for client 104-1 in the figure.

The servers 102 and clients 104 may include additional components not specifically illustrated in this figure but of a type commonly used in implementing authentication processes, as will be appreciated by those skilled in the art.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The communication system 100 as shown in FIG. 1 is configured to allow a first cryptographic device, such as a given one of the clients 104, to authenticate itself to at least a second cryptographic device, such as one or more of the servers 102, using a secret value associated with the first cryptographic device. The communication system 100 and other similar systems herein are therefore also referred to as authentication systems. The secret value may comprise a seed or other key stored in the first cryptographic device that is refreshed in each of a plurality of epochs. The epochs may comprise, for example, respective time intervals. However, the term "epoch" as used herein is intended to be broadly construed so as to also encompass event-based epochs of various types.

In conjunction with the above-noted authentication, or in other situations, the first cryptographic device computes and transmits one or more views to the second cryptographic device. More particularly, in the FIG. 1 embodiment, client 104-1 uses its view processing module 125 to compute and transmit one or more views of a set of keys that is refreshed over multiple epochs to the view processing module 115 of server 102-1.

The view processing module 125 of the client 104-1 thus computes for each of at least a subset of the epochs at least one view based on at least a portion of the set of keys for that epoch, and transmits the views to the view processing module 115 of the server 102-1 in association with their respective epochs. The one or more views computed by the client 104-1 for a current one of the epochs are configured for utilization in combination with one or more previous views computed for one or more previous ones of the epochs to permit the server 102-1 to confirm authenticity of the set of keys for the current epoch. After it confirms authenticity of the set of keys for the current epoch, the server 102-1 can use one or more of those keys to authenticate the client 104-1 based on a passcode provided by that client in the current epoch.

A given one of the views computed by the view processing module 125 may comprise, for example, one or more elements of a codeword that is computed by applying a designated encoding function to the set of keys for the corresponding epoch. In an arrangement of this type, the view may comprise a symbol or set of symbols in the codeword generated by applying an error-correcting code to the set of keys for the current epoch. Numerous other types of views may be used, examples of which will be described in greater detail below. These views generally provide enhanced detectability of a cloned authentication token or other type of cryptographic device.

The views may be configured to allow the server 102-1 to learn the current key state of client 104-1 rapidly, in the sense of requiring only a relatively small number of views. In such an arrangement, the server 102-1 can quickly verify the correctness of submitted views and more efficiently detect cloned devices.

It is to be appreciated that the particular set of elements shown in FIG. 1 for providing view processing functionality in system 100 is presented by way of example, and in other embodiments additional or alternative elements may be used. Thus, another embodiment may include additional networks and additional sets of clients or servers.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

As noted above, in one or more of the illustrative embodiments, the first cryptographic device and the second cryptographic device may comprise an authentication token and an authentication server, respectively.

Figure 2:
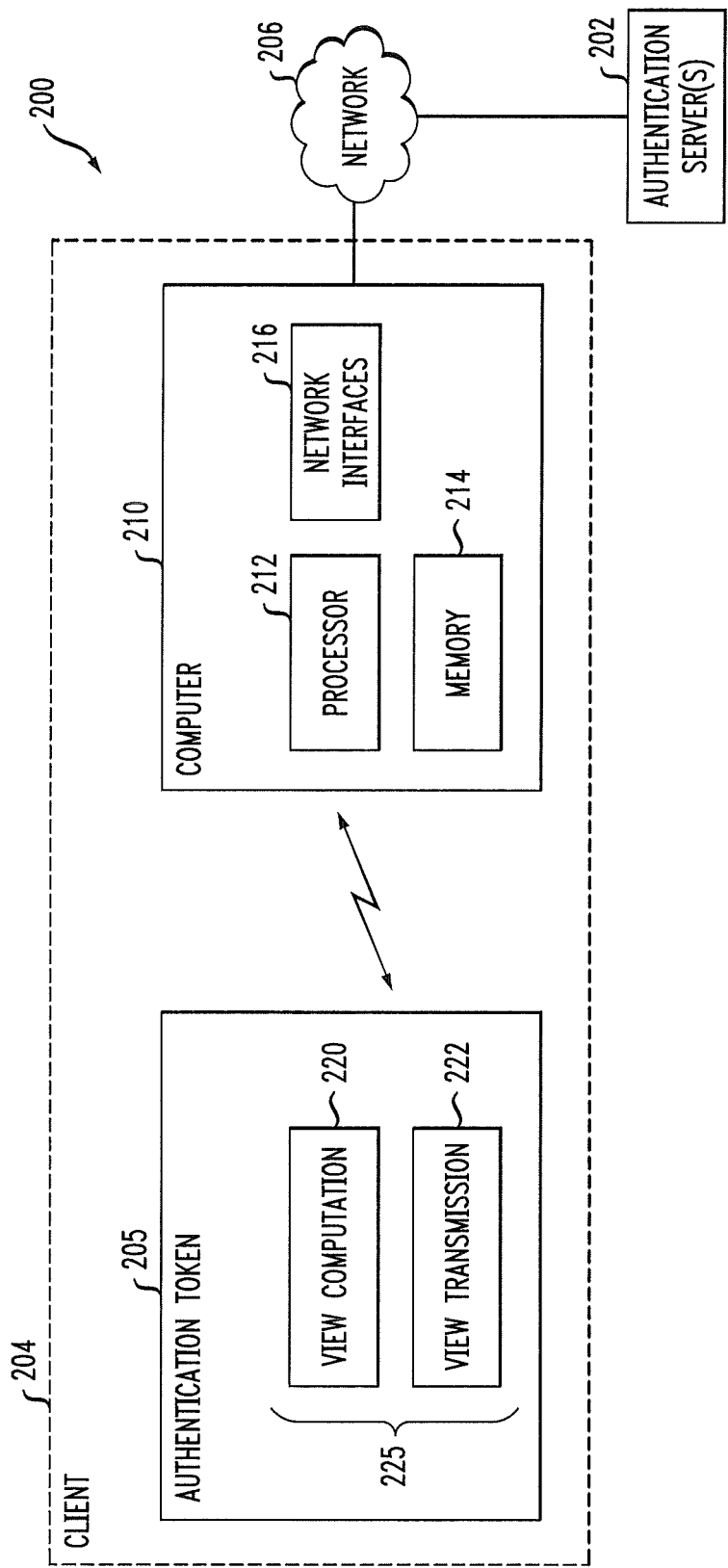
FIG. 2 shows one possible implementation of the FIG. 1 system including an authentication token and an authentication server in an illustrative embodiment of the invention.

FIG. 2 shows an example of an authentication system 200 corresponding generally to an implementation of communication system 100 in which one or more authentication servers 202 authenticate a client 204 that comprises an authentication token 205. Information from the authentication token 205 is sent to a given authentication server 202 via network 206 and a host device that illustratively comprises a computer 210. As indicated previously, the term "cryptographic device" as used herein is intended to be broadly construed so as to encompass, for example, authentication token 205 alone or in combination with at least a portion of the computer 210. In other embodiments, such as those involving use of software tokens, the first cryptographic device may comprise only computer 210, or another type of processing device, such as a mobile telephone.

The authentication token 205 is configured to generate OTPs or other passcodes based on keys that are refreshed over multiple epochs using the techniques disclosed herein. Such passcodes may be presented to a user via a display of the token, such that the user can manually enter a given passcode into a user interface of the computer 210. Alternatively, a given passcode may be communicated directly from the authentication token 205 via a wired or wireless connection between the token and the computer 210. By way of example, the authentication token may be configured to communicate with the computer 210 via a wired connection such as a USB interface, or via a wireless connection such as a Bluetooth or IEEE 802.11 connection.

The authentication token 205 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

As a more particular example, the authentication token 205 may comprise a time-synchronous authentication token such as the above-noted RSA SecurID® user authentication token, suitably modified as disclosed herein.

The authentication token 205 in the present embodiment further comprises a view computation module 220 and a view transmission module 222 that are part of a view processing module 225. The view processing module 225 is generally configured to compute and transmit views associated with the refreshed keys to a corresponding view processing module in a given authentication server 202.

Although the view processing module 225 in this embodiment is implemented in authentication token 205, in other embodiments the view processing module 225 may be implemented at least in part in another system element, such as in the computer 210. As noted above, the token 205 and computer 210 may be collectively viewed as an example of a "cryptographic device" as that term is broadly used herein.

The host device illustratively implemented as computer 210 in the FIG. 2 embodiment may comprise a desktop or portable personal computer, mobile telephone, personal digital assistant (PDA), wireless email device, workstation, kiosk, television set-top box, game console, or any other processing device that provides an interface between authentication token 205 and a given authentication server 202.

As shown in the figure, the computer 210 generally comprises a processor 212, a memory 214, and one or more network interfaces 216 which allow the device to communicate with a given authentication server 202 over the network 206.

It should also be noted that a given authentication token need not take the form of a stand-alone hardware token. For example, such a device may be incorporated into another processing device, such as a computer, mobile telephone, etc. In one such implementation, the host device and the authentication token may be combined into a single processing device that communicates with the authentication server.

In the system 200, the authentication server 202 is configured as a back-end authentication server, in that it communicates with computer 210 over a network, but other types of authentication servers may be used.

A wide variety of authentication processes may be implemented using an authentication token, a host device and a set of one or more authentication servers arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of an authentication token, a host device and a set of one or more authentication servers, and possibly other system components, although only single instances of illustrative examples of such components are shown in the simplified system diagram of FIG. 2 for clarity of illustration. Also, as indicated previously, other embodiments may combine certain system elements, such as an authentication token and a host device. It is also possible to eliminate, modify or replace other system elements. For example, authentication token 205 may communicate directly with authentication server 202, rather than via other elements such as computer 210 and network 206.

The operation of the systems 100 and 200 will now be described in greater detail with reference to the flow diagram of FIG. 3, which illustrates a set of operations performed in part by a given client 104-1 or 204 and in part by a given server 102-1 or 202 in an illustrative embodiment. The given client 104-1 or 204 is referred to in the context of the FIG. 3 flow diagram as a first cryptographic device and the given server 102-1 or 202 is referred to as a second cryptographic device.

The process as shown includes steps 300, 302, 304 and 306. Steps 300, 302 and 304 are assumed to be performed by the given client 104-1 or 204, and step 306 is assumed to be performed by the given server 102-1 or 202. It is to be appreciated that in other embodiments one or more such steps may be implemented at least in part by other system elements.

In step 300, the first cryptographic device illustratively comprising a given client 104-1 or 204 determines m pseudorandom vectors based on a view transmission history $H_T$ at time T. The first cryptographic device in the present embodiment is therefore assumed to comprise a transmission-aware cryptographic device that maintains information characterizing its prior transmissions of one or more previous views to the second cryptographic device. The present embodiment utilizes this view transmission history to construct views that result in improved acquisition of refreshed key information by the second cryptographic device.

One example of a transmission-aware cryptographic device is an event-based hardware or software authentication token that generates a passcode in response to a button press or other physical trigger by a user. Another example of a transmission-aware cryptographic device is a SoftID authentication token from RSA, which typically operates as a software application in a mobile device. These and numerous other types of transmission-aware cryptographic devices can be used in embodiments of the invention. It is to be understood, however, that other embodiments of the invention can be implemented which do not utilize transmission-aware cryptographic devices.

In step 302, the first cryptographic device generates m views as a function of a set of keys for a current epoch and respective ones of the m pseudorandom vectors previously determined in step 300. The set of keys may comprise, for example, a set of drifting keys that is periodically refreshed. However, it should be noted that the term "set of keys" as used herein is intended to encompass any set of one or more keys. Thus, a given set of keys as that term is broadly used herein may comprise only a single key. Also, a given key may comprise any type of secret information used in an authentication process, such as a string of bits or even a single bit in some embodiments.

In step 304, the first cryptographic device transmits the m views generated in step 302 to the second cryptographic device in one or more passcodes, and updates its view transmission history. Thus, for example, a given one of the views may be encoded in a passcode generated by the first cryptographic device and transmitted from the first cryptographic device to the second cryptographic device. Encoding views in passcodes has the effect of decreasing the security of the passcode itself as some of the entropy contained in the passcode is repurposed to transmitting view information. Depending on security requirements, it may be possible to encode several views of the key set into a single passcode, increasing the bandwidth of view transmission, which in turn decreases the number of transmissions necessary for the second cryptographic device to confirm the authenticity of the key set. Numerous other types of transmission may be used, including various conventional side channels or other auxiliary channels that do not involve encoding of the views into passcodes.

As one possible example of view computation and transmission in steps 300 through 304, the set of keys in a given epoch t may comprise a set of t keys $K_t = \langle \kappa_1 \ldots \kappa_t \rangle$, which may comprise a set of drifting keys that evolves over time. A given view may be computed by determining a pseudorandom vector $\vec{v}_T$ for time T based at least in part on T and state information σ shared by the first and second cryptographic devices, and generating the view as $b_T = K_t \cdot \vec{v}_T$. The state information σ may comprise, for example, the current state of a pseudorandom number generator or other type of evolving secret key.

Extending the above example to the generation of m views using m pseudorandom vectors, the m views may be computed by determining m pseudorandom vectors $\{\vec{v}_T^i\}$, i∈{0, ..., m−1} for time T based at least in part on T and state information σ shared by the first and second cryptographic devices, and generating the m views as $b_T^i = K_t \cdot \vec{v}_T^i$. The vectors $\vec{v}_T^i$ may be configured such that only a designated number of final bits of $\vec{v}_T^i$ are non-zero, or such that one or more other specified conditions are satisfied. A given such specified condition may be a condition that ensures that a maximum amount of new information will be transmitted in the computed view or views relative to one or more previous views in the view transmission history.

The resulting m views may be encoded in one or more passcodes generated by the first cryptographic device and transmitted to the second cryptographic device. In some implementations, the m views may comprise respective ones of m freshest bits of the set of keys $K_t = \langle \kappa_1 \ldots \kappa_t \rangle$.

In step 306, the second cryptographic device utilizes the m views as well as previous views received for one or more previous epochs to confirm authenticity of the set of keys for the current epoch.

Figure 3:
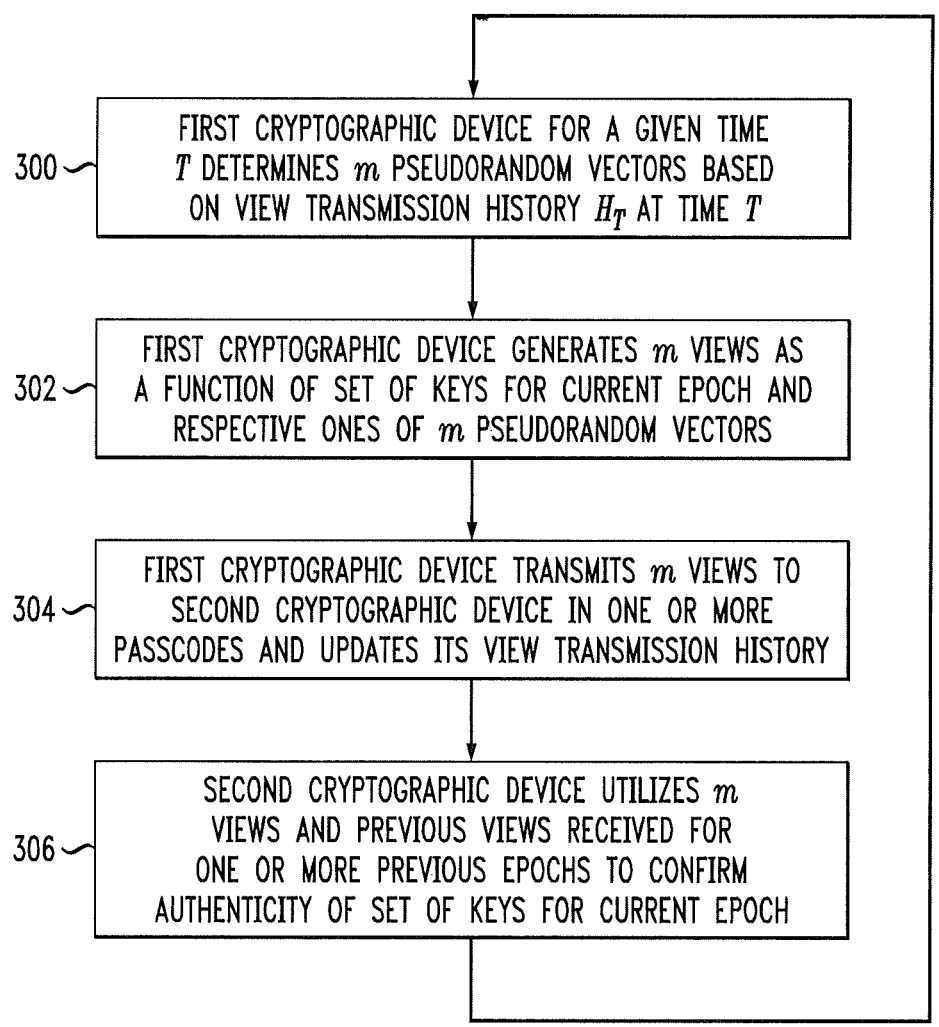
FIG. 3 is a flow diagram of a view computation and transmission process implemented in the system of FIG. 1 or FIG. 2.

Although not specifically indicated in FIG. 3, the second cryptographic device may proceed to authenticate the first cryptographic device based on at least a given one of the one or more passcodes referred to in step 304. This authentication of the first cryptographic device is performed at least in part using the set of one or more keys that was determined to be authentic in step 306.

At some time after the completion of step 306 and any associated authentication of the first cryptographic device based on the authenticated set of keys, the first and second cryptographic devices advance to the next epoch, and steps 300 through 306 are repeated with that epoch as the new current epoch.

The steps 300 through 306 may therefore be performed continuously or intermittently over multiple epochs, as needed in order to provide information to the second cryptographic device regarding refreshed keys.

As mentioned previously, the epochs may comprise respective time intervals or other time-based epochs, or event-based epochs. Other types of epochs, including hybrid time-based and event-based epochs, may be used. The term "epoch" as used herein is therefore intended to be broadly construed.

The operations associated with steps 300, 302 and 304 may be performed at least in part by view processing module 125 in the FIG. 1 embodiment or by view computation and view transmission modules 220 and 222 of the view processing module 225 in the FIG. 2 embodiment.

The operations associated with step 306 may be performed at least in part by view processing module 115 in the FIG. 1 embodiment or by a similar view processing module implemented by the one or more authentication servers 202 in the FIG. 2 embodiment.

The particular processing operations and other system functionality described in conjunction with the flow diagram of FIG. 3 are presented by way of illustrative example only, and should not be construed as limiting the scope of the invention in any way. Alternative embodiments can use other types of processing operations for view computation, transmission and other view processing. For example, the ordering of the process steps may be varied in other embodiments, or certain steps may be performed concurrently with one another rather than serially.

Additional detailed examples of view computation and transmission will now be described.

It is assumed in a first example that a sufficiently large fraction of the passcodes generated by a given transmission-aware first cryptographic device $D_1$ responsive to launch of a transmission-aware passcode generation application are transmitted to a second cryptographic device $D_2$ for verification. Additionally, it is assumed that $D_1$ can establish a lower bound on the set of transmitted passcodes. Thus, if the transmission-aware passcode generation application is launched prior to a scheduled randomization of a secret key $\kappa_i$ and next launched after a scheduled randomization of a secret key $K_{i+1}$, the application may determine at this time that $D_2$ does not have knowledge of $K_i$.

The device $D_1$ in the present example maintains drifting key state information $K_t = \langle \kappa_1, \ldots, \kappa_t \rangle$, where $\kappa_i$ is a bit value. The device $D_1$ and the device $D_2$ share state information $\sigma$. At a given time T, a pseudorandom vector $\vec{v}_T$ is determined as a function of $\sigma$ and T. The emitted view is then $b_T = K_t \cdot \vec{v}_T$. If m views are encoded in a passcode, multiple vectors $\{\vec{v}_T^i\}$, $i \in \{0, \ldots m-1\}$ are generated as a function of $\sigma$, T, and m, with the emitted views being computed similarly.

The view construction process in the present example involves the following two optimizations: (1) Guaranteeing transmission of the freshest m bits, one in each of the m transmitted views, assuming device $D_2$ has knowledge of previous views; and (2) Letting only the last n bits of $\vec{v}_T$ be non-zero, i.e., letting keys expire after n epochs, for a given security parameter n.

To transmit the freshest m bits, as per optimization (1) above, it is sufficient to set using the following rules. If j=t−i, $\vec{v}_T^i[j]=1$, else $\vec{v}_T^i[j]=0$. The remaining positions of $\vec{v}_T^i$ can be assigned randomly.

Thus, in this approach, m pseudorandom vectors $\{\vec{v}_T^i\}$, $i \in \{0, \ldots, m-1\}$ are determined by setting $\vec{v}_T^i[j]_{j \in [t-m+1, \ldots, t]}$ as follows: if j=t−i, setting $\vec{v}_T^i[j]=1$, and otherwise setting $\vec{v}_T^i[j]=0$, and randomly assigning remaining positions of $\vec{v}_T^i$. For the case of m=3, the resulting views are as follows:

| | | | | | | | |
|---|---|---|---|---|---|---|---|
| $\vec{v}_T^0$ | 1 | 0 | 0 | 1 | 0 | 0 | 1 |
| $\vec{v}_T^1$ | 0 | 1 | 0 | 0 | 0 | 1 | 0 |
| $\vec{v}_T^2$ | 1 | 1 | 1 | 0 | 1 | 0 | 0 |

The last three columns in the view table above are in the form of a backwards identity matrix.

Alternatively, instead of only setting one position of the final m positions to 1, all of the positions j∈[t−i, . . . , t] can be set to 1, with the other positions within the last m positions being set to 0.

Thus, in this alternative approach m pseudorandom vectors $\{\vec{v}_T^i\}$, $i \in \{0, \ldots, m-1\}$ are determined by setting $\vec{v}_T^i[j]_{j \in [t-m+1, \ldots, t]}$ as follows: if j∈[t−i, . . . , t], setting $\vec{v}_T^i[j]=1$, and otherwise setting $\vec{v}_T^i[j]=0$, and randomly assigning remaining positions of $\vec{v}_T^i$. The view table in this case for m=3 is as follows:

| | | | | | | | |
|---|---|---|---|---|---|---|---|
| $\vec{v}_T^0$ | 0 | 1 | 0 | 1 | 0 | 0 | 1 |
| $\vec{v}_T^1$ | 1 | 0 | 1 | 0 | 0 | 1 | 1 |
| $\vec{v}_T^2$ | 1 | 1 | 0 | 0 | 1 | 1 | 1 |

A potential advantage of the latter approach relative to the former is that in the latter approach the freshest bits are encoded several times, increasing the number of opportunities for device $D_2$ to learn their values.

More generally, a criterion for guaranteeing transmission of the m freshest bits is to ensure linear independence among the sub-vectors defined by the last m symbols of each view vector. Accordingly, the views in one or more embodiments may be generated by determining m pseudorandom vectors, and generating m views as respective view vectors based on respective ones of the pseudorandom vectors, with the sub-vectors defined by a designated group of elements of each view vector, such as the last m symbols, being substantially linearly independent.

In the foregoing example, $D_1$ and $D_2$ operate in a loosely synchronized fashion. That is, $D_1$ may authenticate successfully even when transmitting at time T a passcode and corresponding view associated with time T+δ for, e.g., some integer δ∈[a,b] where a<0.

There may be additional restrictions on passcode validity, e.g., passcode times may need to be monotonically increasing.

As a result, it is possible for $D_1$ to select among a set of possible views when authenticating at time T.

Accordingly, as previously indicated in conjunction with the FIG. 3 process, $D_1$ may be configured to condition its view selection on its history of view transmissions and available bandwidth. Assume that $K_t = \langle \kappa_1, \ldots, \kappa_t \rangle$ is the current key set, and individual keys are ordered by randomization time. That is, $\kappa_t$ is the most recently generated, $\kappa_{t-1}$ the second most recently, etc. Assume further that the device maintains a record of view transmission during the last n epochs, denoted $H_T$ at time T. These are hypothesized times, as the generated passcodes, even for transmission-aware device $D_1$, may not always reach device $D_2$.

The device $D_1$ computes, for each of the times recorded in $H_T$, the corresponding vectors $V = \{\vec{v}_t^i\}_{i \in H_T}^{i \in \{0, \ldots, m-1\}}$. It selects a time T'=T+δ from δ∈[a, b] such that the vectors $\{\vec{v}_{T'}^i\}^{i \in \{0, \ldots, m-1\}}$ are linearly independent of the vectors in V. This condition ensures that the corresponding view conveys new key information to $D_2$. If linear independence is not possible in a given implementation, T' is selected to maximize the amount of new key information transmitted.

Selection of T' may be biased based on a number of factors, including but not limited to one or more of selecting freshest keys, selecting keys that have been transmitted the fewest number of times, selecting T' closest to the actual time, and ensuring T' is after all previous times in $H_T$.

There may be other restrictions on T', depending on validity criteria for passcodes and their associated times. Additionally, implementations of this technique may introduce a time skew that should be taken into account in order to avoid desynchronization of devices $D_1$ and $D_2$. Also, the view transmission history $H_T$, if captured during token compromise, provides the attacker information about how frequently the authentication token in question is used, which may be undesirable.

As another example, assume device $D_1$ encodes two views in each passcode, where a view is a one-bit value and is generated from a random vector. Following the format of the first view table presented above, position t of the first view and position t−1 of the second view are each set to 1, while position t−1 of the first view and position t of the second view are each set to 0. A simple view-conditioning policy that ensures rapid transmission of the four freshest keys is as follows.

Assume that $D_1$ is about to transmit a view at time T and that $H_T$ indicates that during the last four epochs, i.e., the period in which randomization of $\kappa_{t-3}$ through $\kappa_t$ has taken place, $D_1$ has transmitted only a single passcode, containing two views, at time S<T, with corresponding vectors $\vec{v}_S^0$ and $\vec{v}_S^1$. Then $D_1$ computes the time T'=T+δ with corresponding vectors $\vec{v}_{T'}^0$ and $\vec{v}_{T'}^1$ minimum δ>0 such that all four vectors are independent in the last 4 positions. Note that δ will generally be small, on the order of 2.

Assuming that $D_2$ knows $\kappa_{t-n+1}, \ldots, \kappa_{t-4}$ at time T, then it can use views with corresponding vectors $\vec{v}_S^0, \vec{v}_S^1, \vec{v}_{T'}^0$ and $\vec{v}_{T'}^1$ to solve for $\kappa_{t-3}$ through $\kappa_t$.

The foregoing examples are intended to illustrate aspects of certain embodiments of the present invention and should not be viewed as limiting in any way. Other embodiments can be configured that utilize different view computation and transmission techniques.

It is to be appreciated that view computation, transmission and other processing functionality such as that described in conjunction with the flow diagram of FIG. 3 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1-3 can provide a number of significant advantages relative to conventional practice. For example, these embodiments allow for enhanced detection of cloned authentication tokens or other cryptographic devices by facilitating efficient transmission of views.

View processing techniques of the type described above in conjunction with FIGS. 1-3 may be implemented in a wide variety of different applications.

One example is illustrated in FIG. 4, which shows a communication system 400 comprising a plurality of mobile telephones 402-1 and 402-2 and computers 404-1, 404-2 and 404-3, configured to communicate with one another over a network 406.

Any two or more of the devices 402 and 404 may correspond to respective first and second cryptographic devices configured to compute, transmit and otherwise process views of a key set that is refreshed over multiple epochs as previously described. Thus, for example, a software token application running on one of the mobile telephones 402-1 or 402-2 can compute and transmit views to an authentication server application running on one of the computers 404-1, 404-2 and 404-3. However, it is to be appreciated that the techniques disclosed herein can be implemented in numerous other systems and applications.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from enhanced view processing for drifting keys or other key sets that are refreshed over multiple epochs as disclosed herein. Also, the particular configuration of communication system and processing device elements shown in FIGS. 1, 2 and 4, and the view processing operations shown in FIG. 3, can be varied in other embodiments. Moreover, the various simplifying assumptions made above in the course of describing the illustrative embodiments should also be viewed as exemplary rather than as requirements or limitations of the invention.

Numerous other alternative embodiments within the scope of the appended claims will be readily apparent to those skilled in the art.

What is claimed is:

1. A method comprising:
storing in a first cryptographic device a set of keys that is refreshed in each of a plurality of epochs;
computing for each of at least a subset of the epochs a plurality of views based on at least a portion of the set of keys for that epoch; and
transmitting, in association with respective ones of the epochs, at least a subset of the plurality of views computed for that epoch to a second cryptographic device;
wherein said subset of views for a current one of the epochs is configured for utilization in combination with one or more previous views computed for one or more previous ones of the epochs to permit the second cryptographic device to confirm authenticity of the set of keys for the current epoch.

2. The method of claim 1 wherein at least one view in said subset of views computed for the current one of the epochs comprises one or more elements of a codeword that is computed by applying a designated encoding function to the set of keys for the current one of the epochs.

3. The method of claim 1 wherein transmitting the views comprises transmitting at least one view in said subset of views computed for the current one of the epochs encoded in a passcode generated by the first cryptographic device and transmitted from the first cryptographic device to the second cryptographic device.

4. The method of claim 1 wherein the first cryptographic device comprises a transmission-aware cryptographic device that maintains information characterizing transmission of said one or more previous views to the second cryptographic device.

5. The method of claim 1 wherein the set of keys in a given epoch t comprises a set of t keys $K_t = \langle \kappa_1 \ldots \kappa_t \rangle$.

6. The method of claim 5 wherein at least one view in said subset of views computed for the current one of the epochs is computed by:
determining a pseudorandom vector $\vec{v}_T$ for a given time T based at least in part on T and state information $\sigma$ shared by the first and second cryptographic devices; and
generating said at least one view as $b_T = K_t \cdot \vec{v}_T$.

7. The method of claim 5 wherein computing the plurality of views for the current one of the epochs comprises:
determining m pseudorandom vectors $\{\vec{v}_T^i\}$, $i \in \{0, \ldots, m-1\}$ for a given time T based at least in part on T and state information a shared by the first and second cryptographic devices; and
generating m views as $b_T^i = K_t \cdot \vec{v}_T^i$;
wherein the m views are encoded in a passcode generated by the first cryptographic device.

8. The method of claim 7 wherein the m views comprise respective ones of m freshest bits of the set of keys $K_t = \langle \kappa_1 \ldots \kappa_t \rangle$.

9. The method of claim 7 wherein only a designated number of final bits of $\vec{v}_T^i$ are non-zero.

10. The method of claim 7 wherein determining m pseudorandom vectors $\{\vec{v}_T^i\}$, $i \in \{0, \ldots, m-1\}$ comprises:
setting $\vec{v}_T^i[j]_{j \in [t-m+1, \ldots, t]}$ as follows: if $j=t-i$, setting $\vec{v}_T^i[j]=1$, and otherwise setting $\vec{v}_T^i[j]=0$; and
randomly assigning remaining positions of $\vec{v}_T^i$.

11. The method of claim 7 wherein determining m pseudorandom vectors $\{\vec{v}_T^i\}$, $i \in \{0, \ldots, m-1\}$ comprises:
setting $\vec{v}_T^i[j]_{j \in [t-m+1, \ldots, t]}$ as follows: if $j \in [t-i, \ldots, t]$, setting $\vec{v}_T^i[j]=1$, and otherwise setting $\vec{v}_T^i[j]=0$; and
randomly assigning remaining positions of $\vec{v}_T^i$.

12. The method of claim 1 wherein computing the plurality of views for the current one of the epochs comprises:
determining a plurality of pseudorandom vectors; and
generating a plurality of views as respective view vectors based on respective ones of the pseudorandom vectors;
wherein sub-vectors defined by a designated group of elements of each view vector are substantially linearly independent.

13. The method of claim 1 wherein computing transmitting said subset of views computed for the current one of the epochs comprises:
selecting from a plurality of possible views at a given time;
transmitting the selected view; and
repeating the selecting and the transmitting of the selected view at each of one or more additional times.

14. The method of claim 13 where the selecting at a given time T is based at least in part on a view transmission history $H_T$ and further comprises:
computing, for each time t included in $H_T$, corresponding vectors $V = \{\vec{v}_t^i\}_{t \in H_T}^{i \in \{0, \ldots, m-1\}}$; and
selecting a time $T' = T + \delta$ from $\delta \in [a,b]$ such that the vectors $\{\vec{v}_{T'}^i\}^{i \in \{0, \ldots, m-1\}}$ satisfy a specified condition;
wherein the selected view is based on the vectors $\{\vec{v}_{T'}^i\}^{i \in \{0, \ldots, m-1\}}$.

15. The method of claim 14 wherein the specified condition is that the vectors $\{\vec{v}_{T'}^i\}^{i \in \{0, \ldots, m-1\}}$ are linearly independent of the vectors in V.

16. The method of claim 14 wherein the specified condition is that a maximum amount of new information is transmitted in the selected view relative to previous views in the view transmission history.

17. A computer program product comprising a non-transitory processor-readable storage medium having embodied therein one or more software programs, wherein the one or more software programs when executed by a processor of the first cryptographic device cause the method of claim 1 to be performed.

18. An apparatus comprising:
a first cryptographic device comprising a processor coupled to a memory;
the first cryptographic device being configured to store in the memory a set of keys that is refreshed in each of a plurality of epochs under control of the processor;
wherein the first cryptographic device is further configured:
to compute for each of at least a subset of the epochs a plurality of views based on at least a portion of the set of keys for that epoch; and
to transmit, in association with respective ones of the epochs, at least a subset of the plurality of views computed for that epoch to a second cryptographic device;
wherein said subset of views for a current one of the epochs is configured for utilization in combination with one or more previous views computed for one or more previous ones of the epochs to permit the second cryptographic device to confirm authenticity of the set of keys for the current epoch.

19. The apparatus of claim 18 wherein the first cryptographic device comprises an authentication token and the second cryptographic device comprises an authentication server.

20. The apparatus of claim 19 wherein the authentication token comprises one of a hardware authentication token and a software authentication token.

21. The method of claim 1 wherein said subset of views for the current one of the epochs is selected from the plurality of views computed for the current one of the epochs based at least in part on information characterizing transmission of one or more previous views computed for one or more previous ones of the epochs.

\* \* \* \* \*

UNITED STATES PATENT AND TRADEMARK OFFICE
CERTIFICATE OF CORRECTION

PATENT NO.         : 8,874,904 B1                                            Page 1 of 1
APPLICATION NO.    : 13/713658
DATED              : October 28, 2014
INVENTOR(S)        : Juels et al.

It is certified that error appears in the above-identified patent and that said Letters Patent is hereby corrected as shown below:

In the Specification:

Column 10, line 55, please change " $\bar{v}_T^{\prime} i\, [j] = 0$ " to -- $\bar{v}_T^{\prime}[j] = 0$ --

In the Claims:

Claim 13, column 14, line 17, before "transmitting" please delete "computing"

Signed and Sealed this
Seventeenth Day of February, 2015

Michelle K. Lee
*Deputy Director of the United States Patent and Trademark Office*